US009908436B2

(12) United States Patent
Jones

(10) Patent No.: US 9,908,436 B2
(45) Date of Patent: Mar. 6, 2018

(54) SYSTEM AND METHOD FOR BACKSEAT CHILD SAFETY

(71) Applicant: Gail Yvette Jones, District Heights, MD (US)

(72) Inventor: Gail Yvette Jones, District Heights, MD (US)

(73) Assignee: Gail Yvette Jones, District Heights, MD (US)

( * ) Notice: Subject to any disclaimer, the term of this patent is extended or adjusted under 35 U.S.C. 154(b) by 235 days.

(21) Appl. No.: 15/018,634

(22) Filed: Feb. 8, 2016

(65) Prior Publication Data

US 2016/0297325 A1    Oct. 13, 2016

Related U.S. Application Data

(60) Provisional application No. 62/178,443, filed on Apr. 10, 2015.

(51) Int. Cl.
*B60Q 1/00*    (2006.01)
*B60N 2/00*    (2006.01)
*B60R 22/48*    (2006.01)

(52) U.S. Cl.
CPC .............. *B60N 2/002* (2013.01); *B60R 22/48* (2013.01); *B60R 2022/4816* (2013.01); *B60R 2022/4858* (2013.01); *B60R 2022/4866* (2013.01); *B60R 2022/4891* (2013.01)

(58) Field of Classification Search
CPC . B60N 2/002; B60R 22/48; B60R 2022/4816; B60R 2022/4858; B60R 2022/4866; B60R 2022/4891

USPC .......... 340/457, 573.1, 573.4, 539.1, 539.11, 340/539.13
See application file for complete search history.

(56) References Cited

U.S. PATENT DOCUMENTS

| 9,014,920 | B1* | 4/2015 | Torres | G08B 21/0202 |
| | | | | 701/45 |
| 2005/0099285 | A1* | 5/2005 | Prevatt | B60R 22/48 |
| | | | | 340/457 |
| 2015/0165932 | A1 | 6/2015 | Maley | |
| 2016/0031342 | A1* | 2/2016 | Camello | B60N 2/002 |
| | | | | 701/45 |
| 2017/0323549 | A1* | 11/2017 | Copulos | B60Q 9/00 |

* cited by examiner

*Primary Examiner* — Daryl Pope
(74) *Attorney, Agent, or Firm* — Duane Morrie LLP; David T. Xue

(57) ABSTRACT

A new approach is proposed that contemplates system and method to backseat child safety in a passenger vehicle by preventing locking of the vehicle in a parked state when at least one of its backseats is occupied. Specifically, one or more backseat sensors are each configured to detect if one of the backseats of the vehicle is occupied by a passenger. Upon accepting signals from the backseat sensors indicating that at least one of the backseat is occupied, a vehicle controller is configured to disallow locking of the vehicle in the parked state. The vehicle controller is configured to only enable locking of the vehicle when a backdoor corresponding to the occupied backseat has been opened as detected by one of a plurality of backdoor sensors, which generates and provides a backdoor signal to the vehicle controller when the corresponding backdoor to the occupied backseat is opened.

20 Claims, 5 Drawing Sheets

SYSTEM AND METHOD FOR BACKSEAT CHILD SAFETY

CROSS-REFERENCE TO RELATED APPLICATIONS

This application claims the benefit of U.S. Provisional Patent Application No. 62/178,443, filed Apr. 10, 2015, and entitled "Backseat Seatbelt Sensor (BSS)," which is incorporated herein in its entirety by reference.

BACKGROUND

Modern day passenger vehicles, such as cars, mini-vans, and SUVs typically advise children to sit in backseats instead of the front-row passenger seat in order to avoid potential injuries to the children in a car accident. In recent years, however, several incidents have happened, which led to tragic consequences to children seating in the backseats of the vehicles who were inadvertently left and locked inside the vehicles due to parents' negligence.

Some passenger vehicles have been equipped with backseat seatbelt sensors, which detect and provide indications to the drivers of the vehicles whether any of the backseat seatbelts has been clicked/buckled or released, wherein such indication can be in the form of, for non-limiting examples, messages or light indicators on the dash panel. The backseat seatbelt sensors, however, are not reliable indicators of whether the corresponding backseats are occupied by passengers or not. For a non-limiting example, the backseat seatbelts may be un-buckled or released accidentally by the children during the trip and the front row drivers may not be reminded that there are kids in the backseats when the drivers leave and lock the vehicles in a parked state. In addition, there are no mechanisms currently available to prevent the drivers from locking the vehicles when the back row seats (including the second and/or third row seats) are still occupied. A better solution is desired, which would help to prevent children from being accidentally left behind in the backseats of the vehicles unattended.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
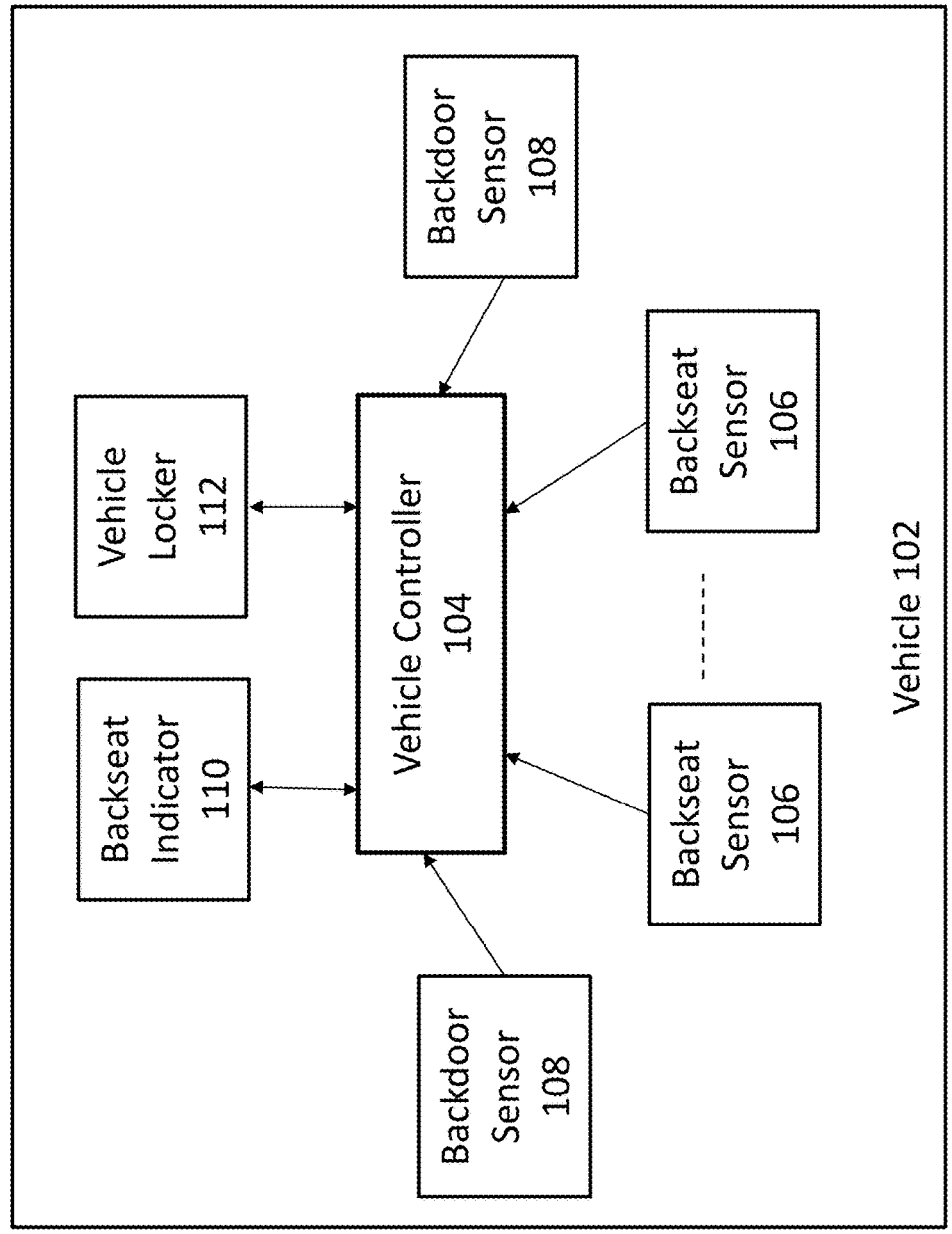
FIG. 1 depicts an example of a system diagram to support backseat child safety in a passenger vehicle in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates system and method to backseat child safety in a passenger vehicle by preventing locking of the vehicle in a parked state when at least one of its backseats is occupied. Specifically, one or more backseat sensors are each configured to detect if one of the backseats of the vehicle is occupied by a passenger. Upon accepting signals from the backseat sensors indicating that at least one of the backseat is occupied, a vehicle controller is configured to disallow locking of the vehicle in the parked state. The vehicle controller is configured to only enable locking of the vehicle when a backdoor corresponding to the occupied backseat has been opened as detected by one of a plurality of backdoor sensors, which generates and provides a backdoor signal to the vehicle controller when the corresponding backdoor to the occupied backseat is opened.

By requiring the driver of the vehicle to open at least one of the backdoors corresponding to the occupied backseat first before allowing the driver to lock the vehicle, the proposed approach effectively prevents the driver/parent from accidentally locking a child in the backseat without noticing it. Since locking of the vehicle can only be enabled by opening the backdoor corresponding to the occupied backseat, unbuckling or releasing of one of the backseat seatbelts, which may happen accidentally due to actions by a passenger/child in the backseat, would not enable the locking mechanism, thus prevent accidental locking of the child in the vehicle.

As referred to hereinafter, locking of the vehicle includes one or more of turning off the engine and power to at least the electrical system and the ventilation system (e.g., air conditioning or air flow system) of the vehicle and locking all doors of the vehicle, either manually by a key to a door or remotely via a remote control (keyless entry) by the driver.

FIG. 1 depicts an example of a system diagram to support backseat child safety in a passenger vehicle. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a vehicle controller 104, a plurality of backseat sensors 106, and a plurality of backdoor sensors 108 of vehicle 102. Here, the vehicle 102 is a passenger vehicle having one front row of driver and passenger seats, and one or more rows of backseats including a second row of seats and optionally a third row of seats. The vehicle 102 can be but is not limited to, a passenger car, a minivan, a SUV, or a pickup truck.

In the example of FIG. 1, the vehicle controller 104 is configured to control various operations and functionalities of the vehicle 102, including but not limited to, disabling and enabling locking of the vehicle (by a vehicle locker 112) based on input signals received from the plurality of backseat sensors 106 and the backdoor sensors 108. In some embodiments, the vehicle controller 104 is a computing unit or a micro-processor with software instructions stored in a storage unit such as a non-volatile memory (also referred to as secondary memory, not shown) of the computing unit for practicing one or more processes. When the software instructions are executed, at least a subset of the software instructions is loaded into memory (also referred to as primary memory, not shown) by the computing unit, the computing unit becomes a special purpose for practicing the processes. The processes may also be at least partially embodied in the computing unit into which computer program code is loaded and/or executed, such that, the computing unit becomes a special purpose computing unit for practicing the processes. When implemented on a general-purpose computing unit, the computer program code segments configure the computing unit to create specific logic circuits. The processes may alternatively be at least partially embodied in a digital signal processor formed of application specific integrated circuits for performing the processes.

Figure 2:
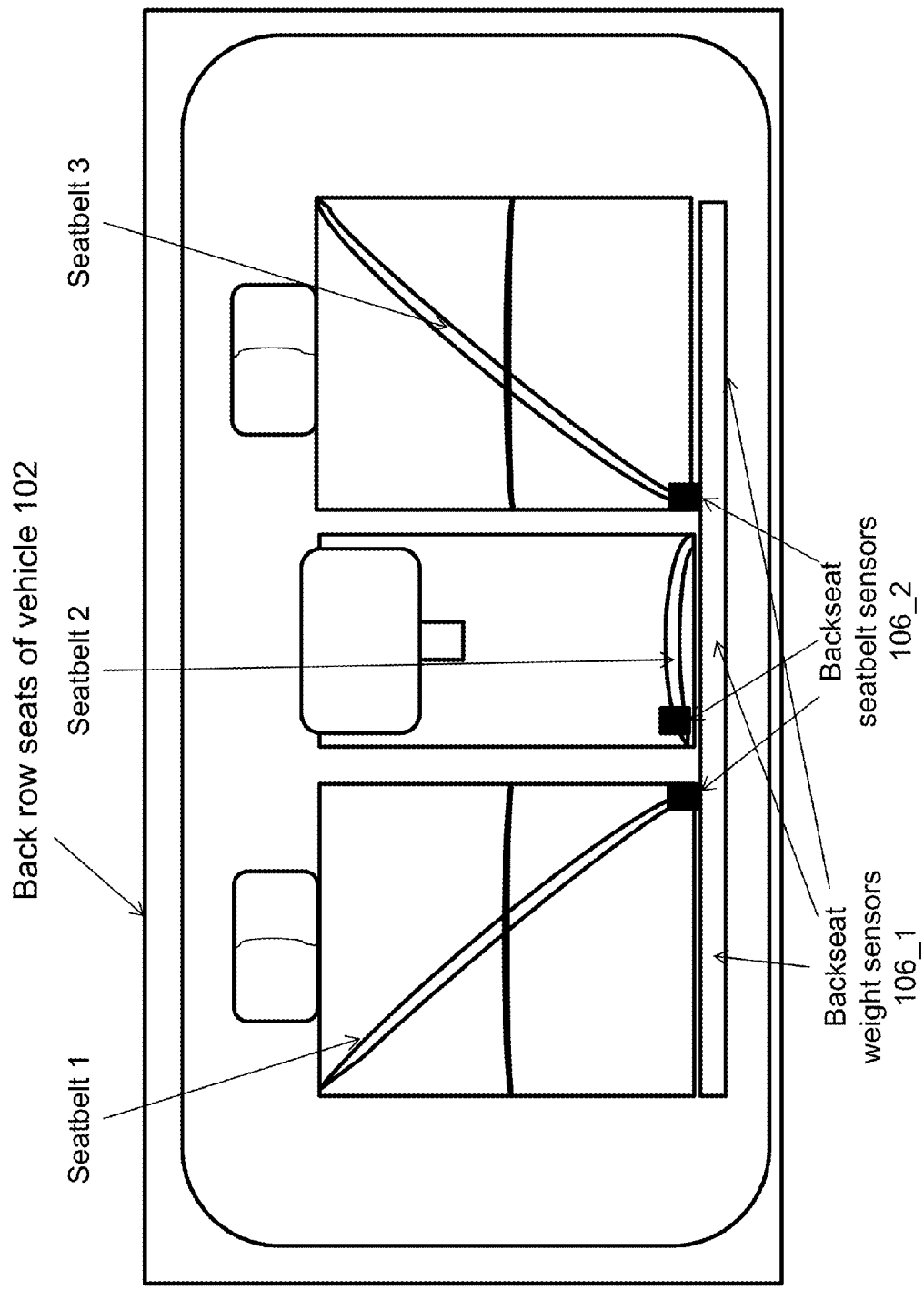
FIG. 2 depicts an example of a plurality of backseat sensors each associated with one of a plurality of backseats of the vehicle in accordance with some embodiments.

In the example of FIG. 1, the plurality of backseat sensors 106 are electronic devices each associated with one of a plurality of backseats of the vehicle 102 and configured to detect if its associated backseat is occupied by a passenger as shown in the example depicted in FIG. 2. If its associated backseat becomes occupied, the backseat sensor 106 is configured to generate and provide a backseat signal to the vehicle controller 104. Here, each of the backseat sensors 106 is positioned in proximity to one of the backseats to detect if the associated backseat is occupied.

In some embodiments, one or more of the backseat sensors 106 are weight/pressure sensors 106_1 located underneath its associated backseat as shown in FIG. 2, wherein each of the weight/pressure sensors 106_1 is configured to detect change in the weight and/or pressure on its corresponding backseat to determine if the backseat has been occupied by a person. Note that either the weight/pressure sensor 106_1 does not generate and provide a backseat signal to the vehicle controller 104 when the backseat becomes unoccupied (as indicated by a reduction in the weight and/or pressure on the backseat), or such signal will be ignored by the vehicle controller 104 as discussed below.

In some embodiments, one or more of the backseat sensors 106 are backseat seatbelt sensors 106_2 each coupled to a buckle of a seatbelt of its associated backseat as shown in FIG. 2, wherein each backseat seatbelt sensor 106_2 is configured to detect when its corresponding seatbelt is inserted or plugged into the buckle of its associated backseat. Note that either the backseat seatbelt sensor 106_2 does not generate and provide a backseat signal to the vehicle controller 104 when the seat becomes unoccupied (e.g., when its seatbelt is unbuckled) or such signal will be ignored by the vehicle controller 104.

In the example of FIG. 1, the plurality of backdoor sensors 108 are electronic devices each associated with one of the plurality of backdoors of the vehicle 102 and each configured to detect if a backdoor corresponding to the occupied backseat has been opened when the vehicle is in the parked state. If the corresponding backdoor to the occupied backseat has been opened, the backdoor sensor 108 is configured to generate and provide a backdoor signal to the vehicle controller 104.

In some embodiments, the vehicle controller 104 is configured to identify and associate the backdoor sensor 108 with the occupied backseat of the vehicle 102 as follows:

If the occupied backseat is behind driver seat of the vehicle 102, the backdoor sensor 108 corresponding to the occupied backseat is associated with the left side backdoor of the vehicle 102.

If the occupied backseat is behind front passenger seat of the vehicle 102, the backdoor sensor 108 corresponding to the occupied backseat is associated with the right side backdoor of the vehicle 102.

If the occupied backseat is the middle backseat of the vehicle 102, the backdoor sensor 108 corresponding to the occupied backseat is associated with either one of the left side and right side backdoor of the vehicle 102 (can be both).

If the occupied backseat is one of the third-row seats of the vehicle 102, the backdoor sensor 108 corresponding to the occupied backseat is associated with either one of left side and right side backdoor of the vehicle 102 (can be both).

Figure 3:
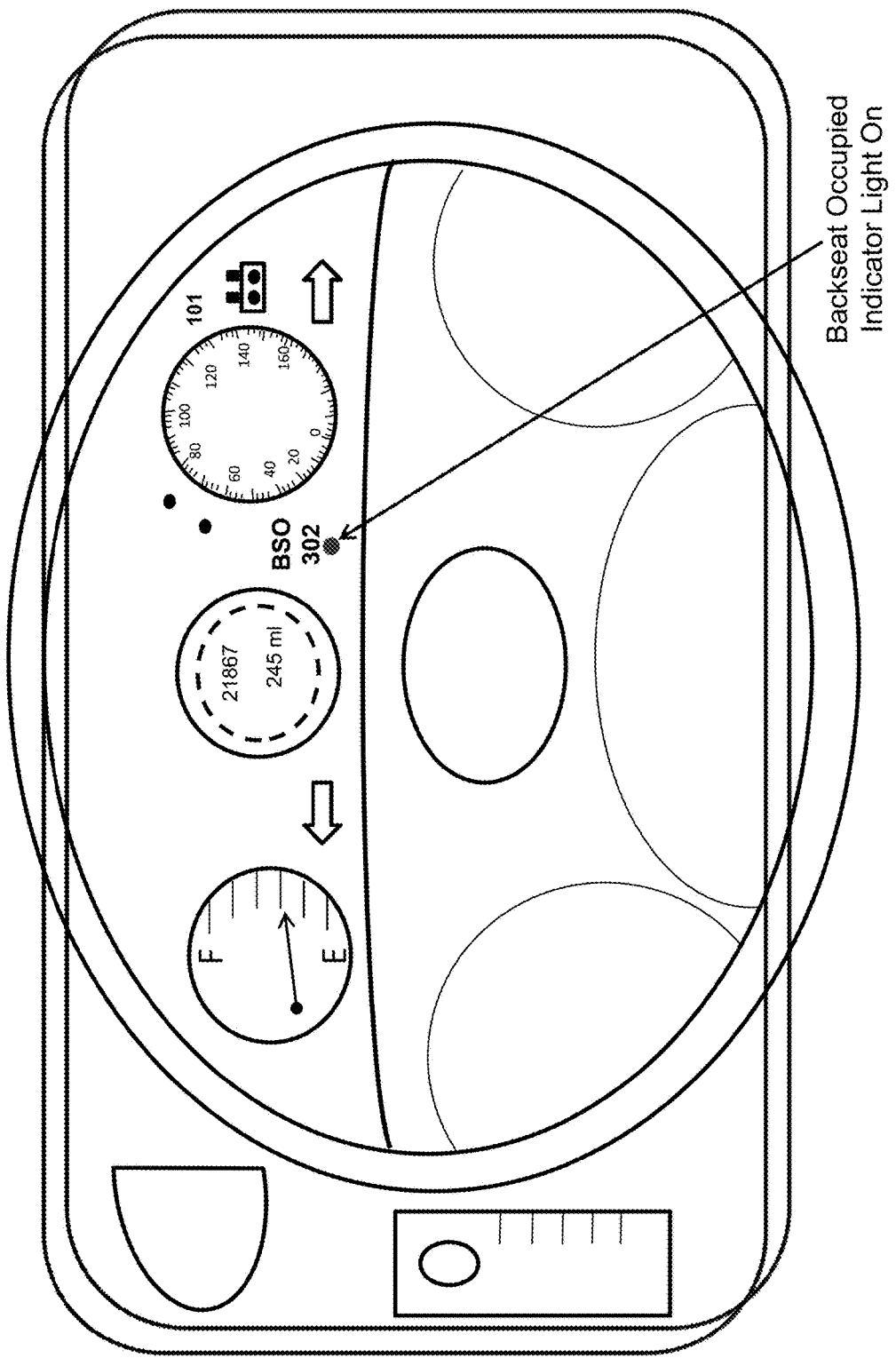
FIG. 3 depicts an example of a backseat occupied (BSO) indicator on dashboard of the vehicle in accordance with some embodiments.

In some embodiments, the system 100 may optionally include a backseat occupied (BSO) indicator 302 located on dashboard of the vehicle 102 as shown by the example depicted in FIG. 3, wherein the BSO indicator 302 indicates whether one of the backseats of the vehicle 102 is occupied or not. The vehicle controller 104 is configured to control and turn on the BSO indicator 302 when one of the backseats of the vehicle 102 is occupied based on the backseat signal it received from one of the backseat sensors 106. The vehicle controller 104 is further configured to turn off the BSO indicator 302 only when the backdoor corresponding to the occupied backseat has been opened when the vehicle 102 is in the parked state upon receiving the backdoor signal from the sensor 108 of the backdoor. Here, as long as the backdoor corresponding to the occupied backseat has not been opened yet, the vehicle controller 104 would not turn off the BSO indicator 302 even when the occupied backseat becomes unoccupied (either because of the passenger no longer occupies the seat or the corresponding seatbelt has been un-buckled as detected by the weight/pressure sensor 106_1 and the backseat seatbelt sensor 106_2, respectively).

Figure 4:
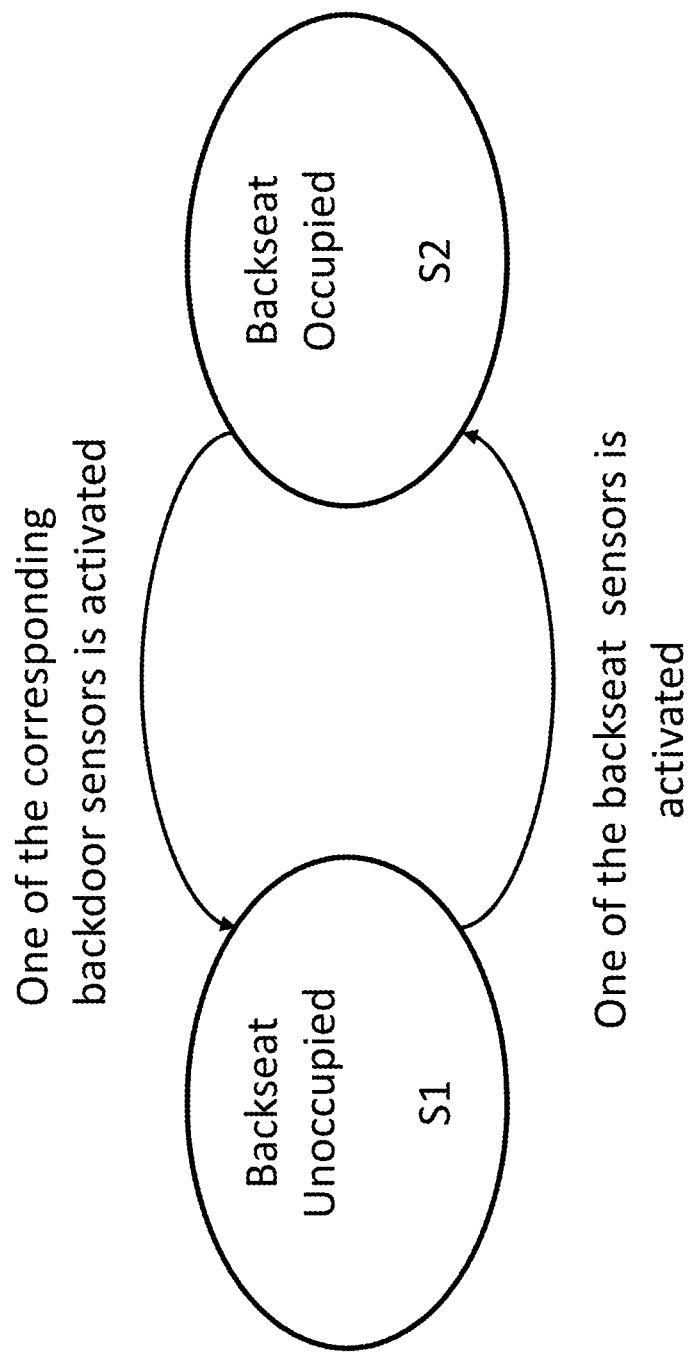
FIG. 4 depicts an example of a an state transition diagram of the vehicle in accordance with some embodiments.

During its operations, the system 100 is originally in state S1 as shown by the example of an state transition diagram shown in FIG. 4, where none of the backseats of the vehicle 102 is occupied. When one of the backseat sensors 106 is activated, i.e., its associated backseat has been occupied (e.g., when a weight increase or clicking of the seatbelt of the backseat is detected), the system 100 transits from state S1 to state S2, where at least one of the backseats of the vehicle 102 is occupied as shown in FIG. 4. In the meantime, the vehicle controller 104 turns on the optional BSO indicator 302 on the vehicle 102's dashboard, indicating to the driver of the vehicle 102 that at least one of the backseats has been occupied. While the vehicle 102 is in state S2, the backseat sensor 106 and BSO indicator 302 would stay on and not be turned off by the vehicle controller 104 even if the backseat passenger/child leaves his/her seat and/or unbuckles his/her seatbelt. The vehicle controller 104 also identifies the backdoor and its sensor 108 corresponding to the occupied backseat as discussed above. So long as the backdoor corresponding to the occupied backseat has not been opened as detected by its sensor 108, the vehicle controller 104 is configured to prevent/disallow locking of the vehicle 102 in a parked state by blocking a vehicle locker 112, which receives a locking signal from the passenger via either a remote control key (e.g., keyless entry) or manually via a key to the doors of the vehicle 102 (note that doors of the vehicle 102 can still be locked when the vehicle 102 is in motion). This safety feature prevents anyone especially a child from being left in an unattended vehicle when the vehicle 102 is in the parked state. The only way to deactivate/reset the backseat sensor 106 is to open the back door that corresponds to the occupied backseat as discussed above by either the driver from outside or the passenger from inside of the vehicle 102, which will activate/trigger the sensor 108 associated with the backdoor and transit the vehicle 102 from state S2 back to state S1. While the vehicle is in state S1, the vehicle controller 104 turns off the BSO indicator 302 on the dashboard; and enables locking of the vehicle 102 either remotely by a keyless entry or manually by a key to a door of the vehicle.

Figure 5:
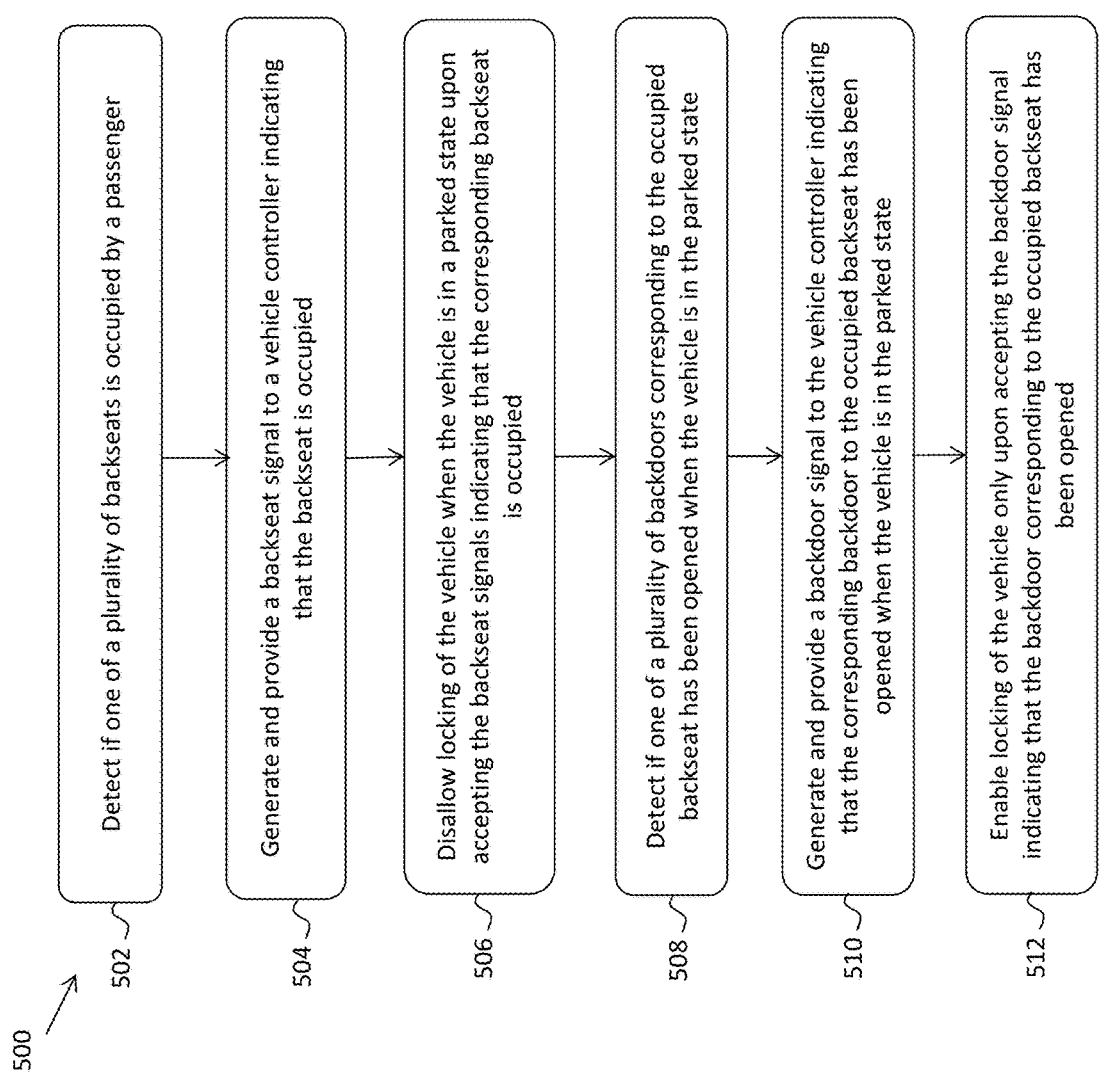
FIG. 5 depicts an example of a flowchart of a process to support backseat child safety in a passenger vehicle in accordance with some embodiments.

FIG. 5 depicts an example of a flowchart of a process to support backseat child safety in a passenger vehicle in accordance with some embodiments. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 5, the flowchart 500 starts at block 502, where one of a plurality of backseats occupied by a passenger is detected. The flowchart 500 continues to block 504, where a backseat signal is generated and provided to a vehicle controller indicating that the backseat is occupied. The flowchart 500 continues to block 506, where locking of the vehicle is disallowed when the vehicle is in a parked state upon accepting the backseat signals indicating that the corresponding backseat is occupied. The flowchart 500 continues to block 508, where one of a plurality of backdoors corresponding to the occupied backseat is detected to have been opened when the vehicle is in the parked state. The flowchart 500 continues to block 510, where a backdoor signal is generated and provided to the vehicle controller indicating that the corresponding backdoor to the occupied backseat has been opened when the vehicle is in the parked state. The flowchart 500 ends at block 512, where locking of the vehicle is enabled only upon accepting the backdoor signal indicating that the backdoor corresponding to the occupied backseat has been opened.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support backseat child safety in a passenger vehicle, comprising:
one or more backseat sensors each associated with one of a plurality of backseats of the vehicle and configured to
detect if its associated backseat is occupied by a passenger;
generate and provide a backseat signal to a vehicle controller indicating that the associated backseat is occupied;
said vehicle controller configured to
disallow locking of the vehicle when the vehicle is in a parked state upon accepting the backseat signal indicating that the corresponding backseat is occupied;
accept a backdoor signal from one of a plurality of backdoor sensors indicating that a backdoor corresponding to the occupied backseat has been opened when the vehicle is in the parked state;
enable locking of the vehicle only upon accepting the backdoor signal indicating that the backdoor corresponding to the occupied backseat has been opened;
said plurality of backdoor sensors each associated with one of the plurality of backdoors of the vehicle and configured to
detect if a backdoor corresponding to the occupied backseat has been opened when the vehicle is in the parked state;
generate and provide the backdoor signal to the vehicle controller indicating that the corresponding backdoor to the occupied backseat has been opened.

2. The system of claim 1, wherein:
the locking of the vehicle includes one or more of turning off the engine and power to at least an electrical system, an ventilation system of the vehicle and locking all doors of the vehicle either manually by a key to a door or remotely via a remote control.

3. The system of claim 1, wherein:
the backseats are on one or more of a second row or a third row seats of the vehicle.

4. The system of claim 1, wherein:
each of the backseat sensors is positioned in proximity to one of the backseats to detect if the associated backseat is occupied.

5. The system of claim 1, wherein:
one of the backseat sensors is a weight/pressure sensor underneath its associated backseat and configured to detect change in the weight and/or pressure on the backseat to determine if the seat has been occupied by a person.

6. The system of claim 5, wherein:
the vehicle controller is configured to ignore a signal from the weight/pressure sensor when the backseat becomes unoccupied as indicated by a reduction in the weight and/or pressure on the backseat.

7. The system of claim 1, wherein:
the backseat sensor is a backseat seatbelt sensor coupled to a buckle of a seatbelt of its associated backseat and configured to detect when the seatbelt is inserted or plugged into the buckle of its associated backseat.

8. The system of claim 7, wherein:
the vehicle controller is configured to ignore a signal from the backseat seatbelt sensor when the corresponding seatbelt is un-clicked or un-buckled by the passenger.

9. The system of claim 1, wherein:
the occupied backseat is behind driver seat of the vehicle, and the backdoor sensor corresponding to the occupied backseat is associated with left side backdoor of the vehicle.

10. The system of claim 1, wherein:
the occupied backseat is behind front passenger seat of the vehicle, and the backdoor sensor corresponding to the occupied backseat is associated with right side backdoor of the vehicle.

11. The system of claim 1, wherein:
the occupied backseat is middle backseat of the vehicle, and the backdoor sensor corresponding to the occupied backseat is associated with either one of left side and right side backdoor of the vehicle.

12. The system of claim 1, wherein:
the occupied backseat is a third-row seat of the vehicle, and the backdoor sensor corresponding to the occupied backseat is associated with either one of left side and right side backdoor of the vehicle.

13. The system of claim 1, further comprising:
a backseat occupied indicator on dashboard of the vehicle, wherein the backseat occupied indicator indicates whether one of the backseats is occupied or not.

14. The system of claim 13, wherein:
the vehicle controller is configured to control and turn on the backseat occupied indicator when one of the backseats of the vehicle is occupied based on the backseat signal provided by one of the backseat sensors.

15. The system of claim 14, wherein:
the vehicle controller is configured to turn off the backseat occupied indicator only when the backdoor corresponding to the occupied backseat has been opened when the vehicle is in the parked state.

16. A method to support backseat child safety in a vehicle, comprising:
detecting if one of a plurality of backseats is occupied by a passenger;
generating and providing a backseat signal to a vehicle controller indicating that the backseat is occupied;
disallowing locking of the vehicle when the vehicle is in a parked state upon accepting the backseat signals indicating that the corresponding backseat is occupied;
detecting if one of a plurality of backdoors corresponding to the occupied backseat has been opened when the vehicle is in the parked state;
generating and providing a backdoor signal to the vehicle controller indicating that the corresponding backdoor to the occupied backseat has been opened when the vehicle is in the parked state;
enabling locking of the vehicle only upon accepting the backdoor signal indicating that the backdoor corresponding to the occupied backseat has been opened.

17. The method of claim 16, wherein:
the locking of the vehicle includes one or more of turning off the engine and power to at least an electrical system, an ventilation system of the vehicle and locking all doors of the vehicle either manually by a key to a door or remotely via a remote control.

18. The method of claim 16, further comprising:
ignoring a signal that the occupied backseat becomes unoccupied.

19. The method of claim 16, further comprising:
controlling and turning on a backseat occupied indicator when one of the backseats of the vehicle is occupied based on the backseat signal, wherein the backseat occupied indicator is located on dashboard of the vehicle.

20. The method of claim 19, further comprising:
turning off the backseat occupied indicator only when the backdoor corresponding to the occupied backseat has been opened when the vehicle is in the parked state.

* * * * *